United States Patent [19]
Porter et al.

[11] 3,887,194
[45] June 3, 1975

[54] MEMBRANE TENSIONING MEANS AND THE USE THEREOF

[75] Inventors: Joe A. Porter, Whittier; Allen F. Dageforde, Santa Ana, both of Calif.

[73] Assignee: Betz Laboratories, Inc., Trevose, Pa.

[22] Filed: Mar. 7, 1974

[21] Appl. No.: 449,140

[52] U.S. Cl. .................. 277/1; 277/12; 277/170; 204/195 P; 210/450
[51] Int. Cl............................ F16j 9/00; F16j 15/00
[58] Field of Search .......... 277/168, 170, 171, 1, 12; 204/195 P; 215/352; 220/89 A; 210/450

[56] References Cited
UNITED STATES PATENTS

| | | | |
|---|---|---|---|
| 2,458,817 | 1/1949 | Wolfram | 277/170 UX |
| 3,206,216 | 4/1965 | Crook | 210/450 X |
| 3,235,477 | 2/1966 | Keyser et al. | 204/195 P |

FOREIGN PATENTS OR APPLICATIONS

| | | | |
|---|---|---|---|
| 465,605 | 9/1951 | Italy | 215/352 |

*Primary Examiner*—Samuel B. Rothberg
*Attorney, Agent, or Firm*—Alexander D. Ricci

[57] ABSTRACT

The present invention is directed to a system and a method for tensioning a pliable, flexible material such as a membrane or film with the objective of minimizing the wrinkling tendency of the membrane. The method comprises applying a sealing means to a surface, applying the flexible material to the subject surface and against the sealing means, exerting a compressive force against the membrane and sealing means to cause the sealing means to respectively engage, tension and seal the membrane against the surface. The improvement is the provision of a groove in which the sealing means is loosely positioned, which groove is so designed as to provide that when the sealing means is compressed it flows in the groove, and then expands outwardly of the groove to engage and tension the membrane. The aspect which provides minimization of the wrinkling or lapping of the flexible material is the design of the groove. The groove basically possesses an inclined floor or ceiling as the case may be, which ensures the outward flow of the sealing means during compression. The outward flow provides proper tensioning together with minimum wrinkling or lapping of the material.

16 Claims, 7 Drawing Figures

MEMBRANE TENSIONING MEANS AND THE USE THEREOF

BACKGROUND OF THE INVENTION

The present invention relates to a method for proper tensioning and sealing of materials such as membranes used in various types of applications such as in electrochemical cells and sensors. Since membrane materials are generally manufactured and sold in flat sheets, use of the material on a surface other than one which is flat requires that the material be carefully tensioned or stretched so as to provide a wrinkle or lap-free surface.

Various techniques have been utilized in an attempt to accomplish the proper and necessary stabilization, sealing and tensioning of membranes on non-planar surfaces. These techniques have involved the use of such items as separate membrane holders, pre-shaped or molded membranes, specially designed clamping means or caps, etc. all of which have added complexity and costs to the final assembly.

Simpler techniques utilizing rubber bands, O-rings and the like did not previous to the present invention provide proper sealing, membrane stability and the substantially wrinkle-free or lap-free surface generally required.

The various techniques and the disadvantages thereof together with the area of concern are quite comprehensively described and discussed in U.S. Pat. No. 3,577,332.

In view of the foregoing then, it was the present inventors' objective to devise a relatively simple and inexpensive method for ensuring proper tensioning and sealing with minimum wrinkling of a membrane against planar or non-planar surfaces. The invention hereafter described did in fact fulfill the inventors' objectives. These objectives were attained by improving on the previously used O-ring and rubber band techniques which were earlier referred to and more comprehensively described in the cited U.S. patent.

GENERAL DESCRIPTION OF THE INVENTION

Reference is hereby made to the FIGURES of the Drawing which depict the substance of the invention. The FIGURES are directed for the most part, to the invention as it applies to a non-planar surface. The non-planar surfaces present more of a problem than most planar surfaces and accordingly it was felt that if the Figures were directed principally to this aspect the advancement provided by the invention would be more easily appreciated.

The invention is generally directed to the combination of a flexible membrane or material held in tension against a planar or non-planar surface in sealing engagement with respect to the surface. A groove formed in the surface or in the surface of the clamping means later described possesses a compressible sealing means loosely positioned in the groove. An adjustable clamping means exerts a compressive force against either the membrane or against the sealing means as the case might be. The groove is of such design as to cause the sealing means upon compression to flow in the groove and then expand outwardly of the groove to engage the membrane, and apply tension thereto and substantially seal the membrane against said surface.

Figure 6:
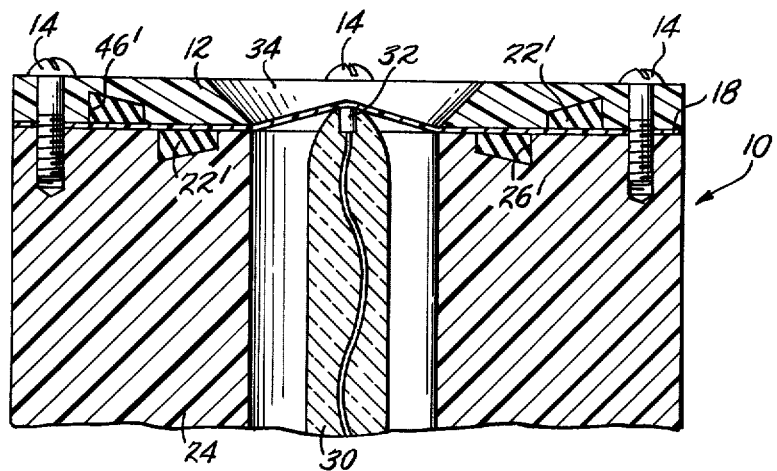
FIG. 6 is a fragmentary vertical sectional view of the cell as assembled depicting the combination of the respective features of FIGS. 2 and 4.

The sealing means is generally an item such as an O-ring having specific dimensions as regards the groove. The groove in most instances will be a blind circular slot encircling the surface against which the membrane is to be tensioned. As apparent from the Drawings the groove may be located either on the non-planar surface of the main body of device or cell or it may be in the adjustable clamping means used to exert pressure on and compress the sealing means, for example the O-ring. In certain instances it may be advantageous to utilize a double groove-sealing means system, with the grooves and sealing means either provided in the same surface or the opposite surfaces as depicted in FIG. 6 of the Drawings.

The use of any of the modifications are quite successful provided that the groove or slot is designed so as to possess the proper dimensions, and especially the angled or sloped floor or ceiling as the case might be. It is this specific aspect that provides the advantageous improvement, and where the present invention deviates from and distinguishes over that which has been previously done.

Prior teachings and uses of O-rings for the present purposes have not been particularly successful since proper tensioning without wrinkling or overlap of membrane was not achievable. When the compressive force was applied to the O-ring in accordance with previous practice, the O-ring expanded uniformly because of the uniform surfaces and merely flattened. Adequate sealing was obtained, however, the poor tensioning and consequently the wrinkling aspects remained virtually unchanged.

Because of the angled or sloped surface as per the instant invention, the O-ring or sealing means when compressed flows in the groove outwardly and then expands outwardly of the groove to first engage and then to tension and seal the membrane.

Specific reference to the Figures of the drawing will more clearly define the substance of the invention.

Figure 1:
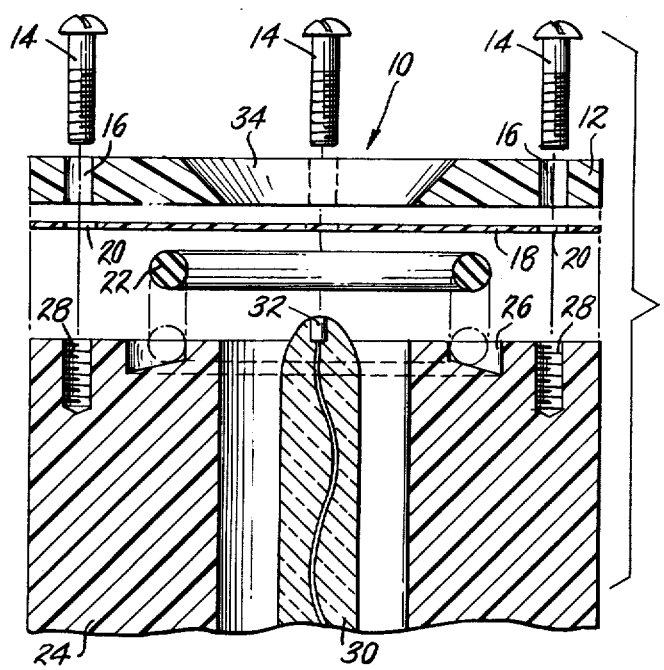
FIG. 1 is an enlarged fragmentary exploded vertical sectional view of the electrochemical cell depicting the applicability of the present invention to non-planar surfaces.
Figure 2:
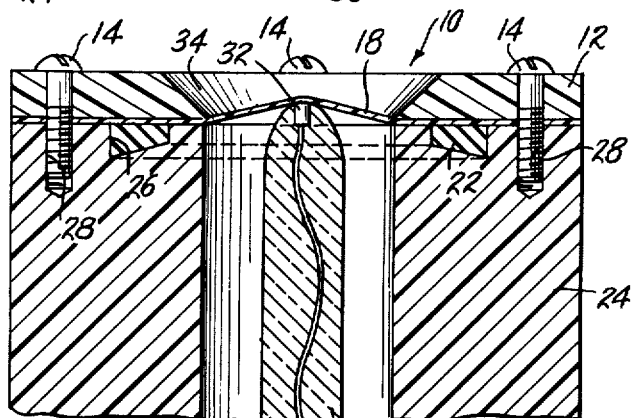
FIG. 2 is a fragmentary vertical sectional view of the cell of FIG. 1 shown in its assembled relation.

Cell or sensor device 10 is composed of two elementary parts adjustable clamping means (cap) 12 and basic cell or sensor structure 24. Cap 12 is provided with openings 16 and 34, through which respectively bolts 14 and cathode post 30 pass for each respective purpose. Membrane 18 which is provided with openings 20 engages with sealing means (O-ring) 22 fitted in groove 26 in primary cell structure 24. Cell structure 24 is provided with threaded openings 28 adapted to receive bolts 14 and permit the engagement of clamping means 12 against membrane 18 and against O-ring 22 in groove 26 to thereby obtain the unit as depicted in FIG. 2. FIG. 1 illustrates the necessary non-planar positioning of membrane 18 against sensing means 32 of cathode post 30 both of which protrude through opening 34 of clamping means 12.

FIG. 2 shows a completely assembled version of FIG. 1, and in particular the position of the fully compressed O-ring 22 in groove 26.

Figure 3:
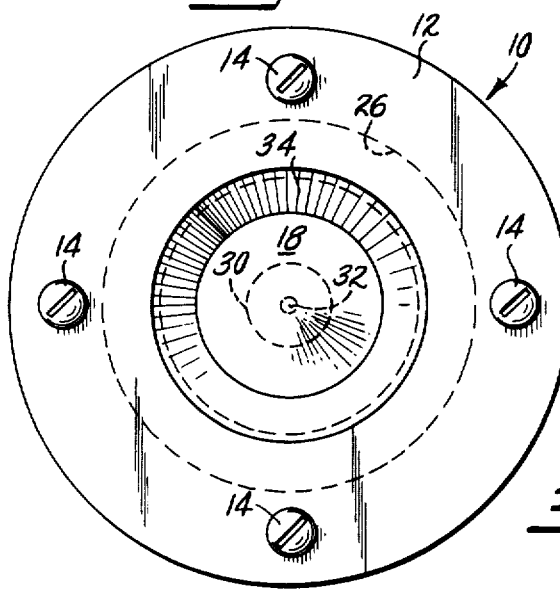
FIG. 3 is a plan view of the cell of FIG. 2.

FIG. 3 provides a plan view of the fabricated arrangement of FIG. 2 setting forth the elements as they would appear in accordance with that view.

Figure 4:
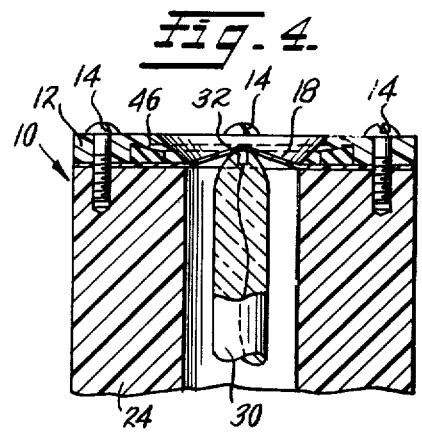
FIG. 4 is a fragmentary vertical sectional view, similar to FIG. 2 on a smaller scale, of a modified form of cell.

FIG. 4 depicts the modification where groove 26 of FIG. 1, referenced as 46 in FIG. 4 is in fact provided in clamping means 12 as opposed to the alternative of FIG. 1 where the groove is provided in the primary cell structure 24. Except for this modification, the Figures are basically the same.

Figure 5:
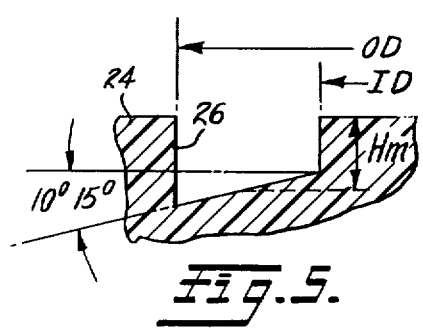
FIG. 5 is a fragmentary vertical sectional view of the groove depicting the preferred design and dimension thereof for effectuating the proper sealing and tensioning.

FIG. 5 represents an expanded view of the preferred design for grooves 26 or 46 as they are provided in primary cell structure 24 and clamping means 12 respectively as depicted in FIGS. 1 and 4.

Details of the groove as shown in FIG. 5 and the dimensional criteria as represented are as follows:

1. ID should be the same as or slightly greater than the ID of the O-ring.
2. OD should be the maximum diameter to which the O-ring is allowed to expand. This also determines the tension applied to the membrane.
3. Hm is determined from the squeeze required on the O-ring when in the sealed position. The squeeze generally is between 15 and 30% of O-ring thickness for most applications.
4. The bottom of the O-ring groove should be sloped at an angle of approximately 10°–15°.

FIG. 6 illustrates the modification of the invention where a dual sealing means-groove system is utilized, and in particular where the particular characteristics as shown in FIGS. 2 and 4 are combined. More specifically grooves 26' and 46' according to the invention are provided together with sealing means 22' shown in compressed state on both the primary cell structure 24 and clamping means 12.

The remaining elements are represented by the numbers utilized previously in the preceding Figures.

Figure 7:
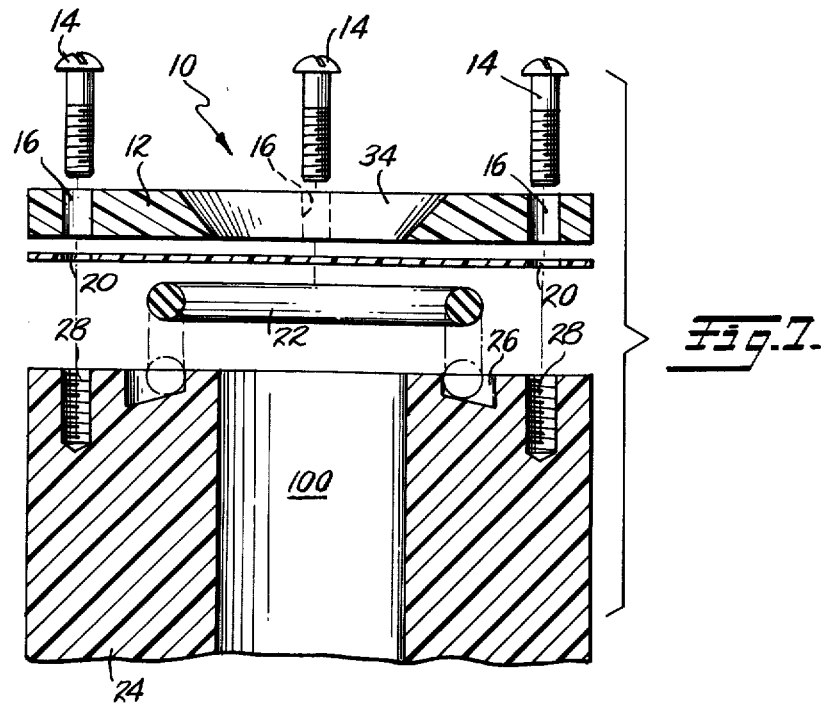
FIG. 7 is a fragmentary vertical sectional view depicting the invention when used in conjunction with planar surfaces.

FIG. 7 depicts the applicability of the invention as it pertains to planar surfaces. To eliminate further cumbersome numbering, the numbering of element of FIG. 1 has been retained. In this instance the cell or membrane combination does not possess cathode 30. In its place is cavity 100. The system would find usage for example in producing semi-permeable membrane systems. Such systems are required in desalinization process where water flow from one side (cavity 100) of the membrane to the other (opening 34) is necessary. In these applications proper tensioning and wrinkle free surfaces are a necessity to insure proper and economical function of the systems.

Functionally the membrane is applied to the sensor as follows:

1. The O-ring is inserted in the O-ring groove and a piece of membrane material placed over the end of the sensor.
2. The sensor cap or clamping means is placed on top of the membrane.
3. Holes are punched in the membrane to accommodate cap hold down screws or bolts.
4. Hold down screws are tightened down slowly and evenly until the cap is tight against sensor body. As the cap is tightened down the membrane is firmly in contact with the O-ring. The O-ring is forced down in the groove and expands outward because of the angle of the bottom of the groove. This outward expansion stops when the O-ring contacts the outside of the groove or the cap is tightened completely. A properly tensioned membrane substantially free from wrinkles results from the even radial stress applied.
5. Excess membrane is trimmed from around cap. Because of the groove design replacement membranes applied to the same sensor body are tensioned to the same degree. The result accordingly insures that output from the sensor is essentially unchanged as membrane tension directly affects the transport properties of the membrane. Such reproducibility is a very desirable feature in instrumentation.

Use of this invention is not necessarily limited to that specifically described. Applications in other areas such as specific ion electrodes, ion exchange membranes, filters, dialysers, as well as many others are immediately suggested to anyone skilled in the art. Moreover, although the particular angle of the floor or ceiling as the case might be of the groove has been depicted as being between from about 10° to about 15°, it is clear that in certain situations the angle might be increased or decreased depending upon the dictates of the particular application.

Having thus described the invention, what we claim is:

1. The combination of a flexible membrane held in tension against a surface in sealing engagement with respect to said surface, a groove formed in said surface and compressible sealing means loosely positioned in said groove, adjustable clamping means overlying said groove and exerting a compressive force against said membrane and also against said sealing means said groove being of such design as to cause said sealing means upon compression to flow in said groove and then expand outwardly of said groove to engage said membrane and to tension and substantially seal said membrane against said surface.

2. The invention of claim 1 wherein the sealing means is an O-ring.

3. The invention of claim 1 wherein the groove is a blind circular slot with an inclined floor.

4. The invention of claim 3 wherein the floor is inclined from about 10° to about 15°.

5. The invention of claim 4 wherein the surface is non-planar.

6. The invention of claim 5 wherein the blind circular slot encircles the non-planar surface.

7. The combination of a flexible membrane held in tension against a surface in sealing engagement with respect to said surface, a clamping means overlying said membrane and having a groove formed in its surface in contact with said membrane and having a compressible sealing means loosely positioned in said groove, said clamping means exerting a compressive force against said membrane and said non-planar surface and against said sealing means, said groove being of such design as to cause said sealing means upon compression to flow in said groove and then expand outwardly of said groove to engage said membrane and to tension and substantially seal said membrane against said surface.

8. The invention of claim 7 wherein the sealing means is an O-ring.

9. The invention of claim 7 wherein the groove is a blind circular slot with an inclined floor.

10. The invention of claim 9 wherein the floor is inclined from about 10° to about 15°.

11. The invention of claim 10 wherein the surface is non-planar.

12. The invention of claim 11 wherein the blind circular slot encircles the non-planar surface.

13. A method of holding a flexible membrane in tension against a surface in sealing engagement with respect to said surface, said method comprising applying sealing means to said surface, applying a flexible membrane to said surface and against said sealing means, exerting a compressing force against said membrane and sealing means to cause said sealing means to respectively engage, tension and seal said membrane against said surface, the improvement being that said sealing means is loosely positioned in a groove in said surface and designed so as to provide that said sealing means when compressed flows in said groove and then expands outwardly of said groove to engage and tension said membrane.

14. A method according to claim 13 wherein the groove is a blind circular slot having an inclined floor.

15. A method according to claim 14 wherein the surface is non-planar and the groove is a blind circular slot which encircles the non-planar surface, and said sealing means is an O-ring.

16. A method according to claim 15 wherein the floor is inclined from about 10° to about 15°.

* * * * *